May 14, 1940. W. C. McNITT Re. 21,449
TOMATO JUICE EXTRACTOR
Original Filed Aug. 7, 1934 3 Sheets-Sheet 1
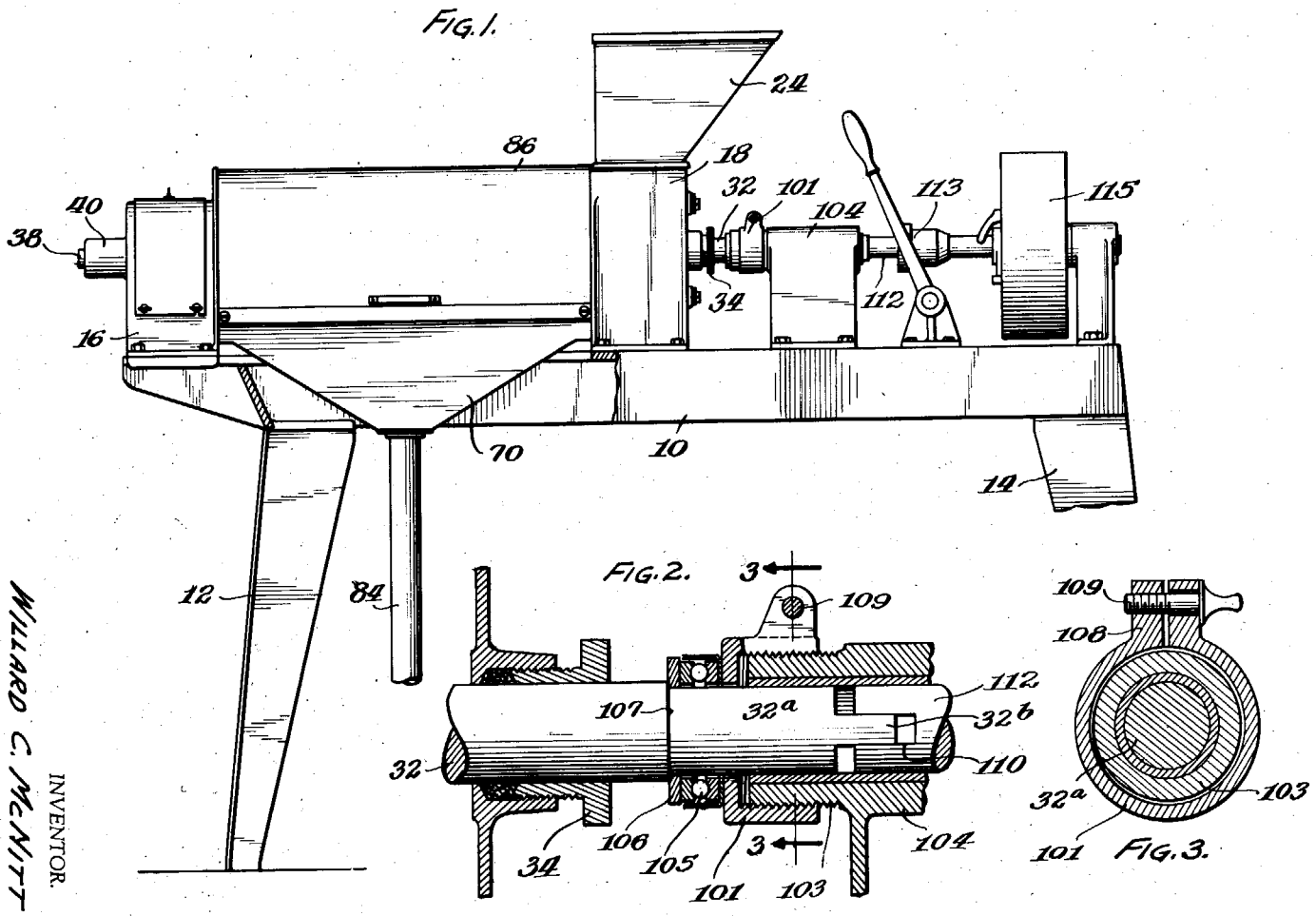
INVENTOR.
WILLARD C. McNITT
BY
Harry H. Hitzeman
ATTORNEY.

May 14, 1940. W. C. McNITT Re. 21,449
TOMATO JUICE EXTRACTOR
Original Filed Aug. 7, 1934 3 Sheets-Sheet 2
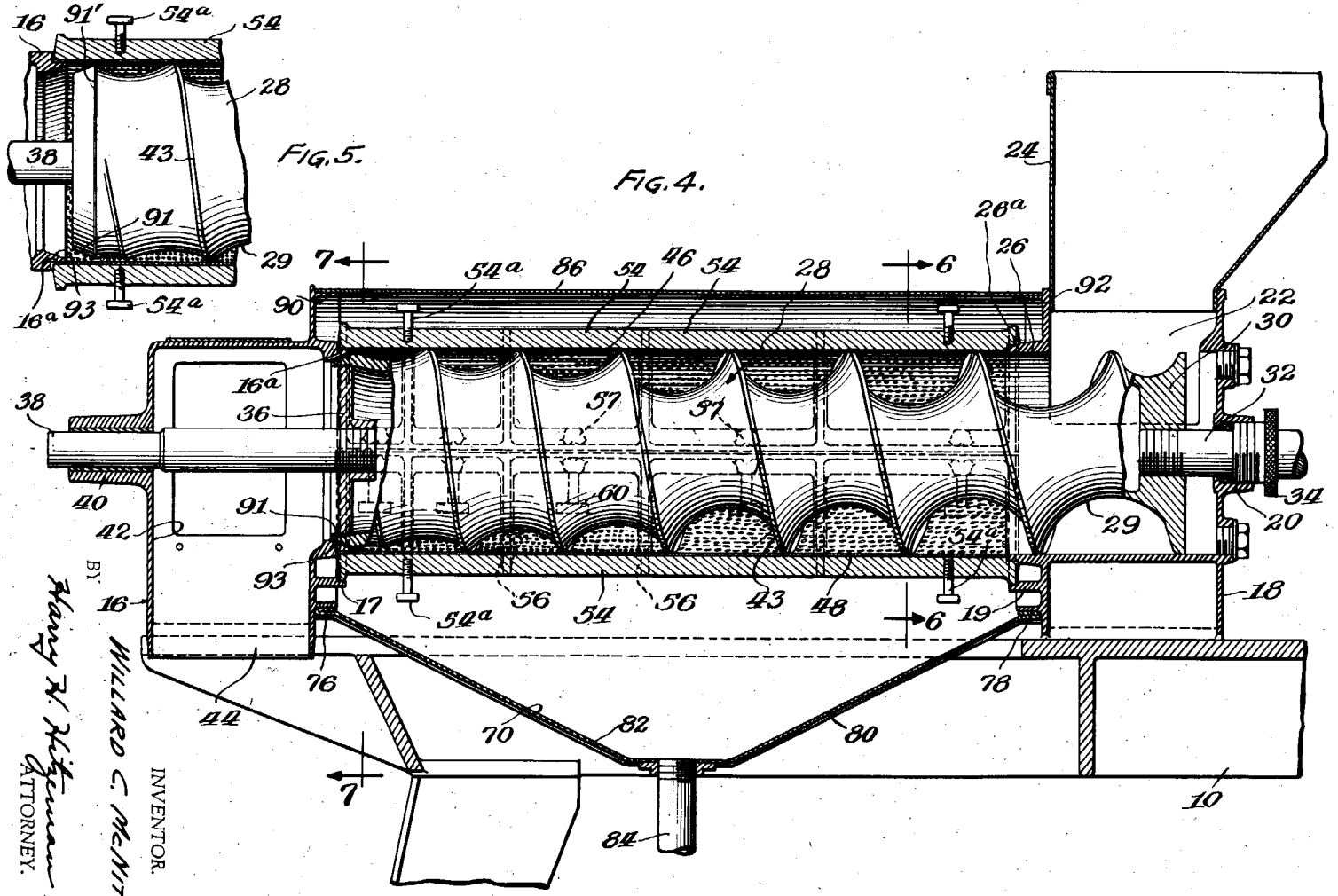
INVENTOR.
WILLARD C. McNITT
BY
Harry H. Hitzeman
ATTORNEY.

May 14, 1940. W. C. McNITT Re. 21,449

TOMATO JUICE EXTRACTOR

Original Filed Aug. 7, 1934 3 Sheets-Sheet 3

INVENTOR.
WILLARD C. McNITT
BY
Harry H. Hitzeman
ATTORNEY.

Reissued May 14, 1940

Re. 21,449

UNITED STATES PATENT OFFICE 21,449

TOMATO JUICE EXTRACTOR

Willard C. McNitt, deceased, late of Winnetka, Ill., by American Utensil Company, Chicago, Ill., assignee Original No. 2,109,398, dated February 22, 1938, Serial No. 738,834, August 7, 1934. Application for reissue February 15, 1940, Serial No. 319,176

16 Claims. (Cl. 100—48)

My invention relates to improvements in pulpers or juice extractors and like devices.

My invention relates more particularly to improvements in extractors for use on tomatoes for the production of tomato juice.

My invention relates to devices of the type mentioned for extracting juices and capable of effective operation upon fruits of all kinds, pineapples, berries and vegetables such as peas, corn, beets and carrots.

An object of the present invention is to provide a pulper or juice extractor of the type described operating upon an entirely different principle from any of the similar devices of the prior art.

In the past it has been the practice to provide juice extractors of pulpers which provide paddles for pulping or extracting the juice from the material. These paddles revolve inside of a screen at a high rate of speed and consequently beat and whip the juice and pulp through the screen, which results in aerating the juice. It is now generally known in the trade that flavor, taste and quality of tomato juice and other juices are injured by exposure to air more than by anything else, and it has been found that the less the juice is exposed to the air, the more flavor, color and vitamins it contains.

Another type of machine of the prior art is the hydraulic press, which is a batch press, whereby the juices are forced through cloths and after the pressing operation, the press is released and the dry pulp is disposed of. This is a slow and impractical process and is not being very widely used for extraction of juices such as those hereinbefore mentioned.

An object of the present invention is to provide an improved type of extractor or pulper capable of operating upon fruit or vegetable products from which it is desired to extract the juices, in a manner similar to hand squeezing. This type of pressing action commences with slight squeezing which gradually becomes harder and harder until all of the juices have been pressed from the product.

A further object of the invention is to provide an improved apparatus for pulping and extracting by a continuous feed process by means of which large quantities of juice may be extracted.

A further object of the invention is to provide in an extractor of the type specified an improved spiral or screw member for operating upon the materials.

A further object of the invention is to provide adjustment means for the screw member whereby both the density of the juice extracted and the amount of juice recovered can be controlled by the operator.

A further object of the invention is to provide improved means for controlling the operation of the apparatus to increase or decrease the capacity thereof.

A further object of the present invention is to provide in a machine of the class described an improved screen member capable of easy removal or change in the event it becomes broken or out of order.

A further object of the present invention is to provide in the apparatus split screen members therefor, whereby the upper and lower screen members are interchangeable.

A further object of the present invention is to provide in apparatus of the class described an improved waste or pomace discharge means capable of regulation and adjustment.

A further object of the invention is to provide a mechanism of the class described that is comparatively simple in construction and operation and one which will not easily become broken or out of order.

Other objects and advantages will be more apparent from the following description wherein reference is had to the accompanying three sheets of drawings upon which Fig. 1 is a side elevational view of my improved apparatus;

Fig. 2 is a vertical fragmentary sectional view showing the spiral screw adjusting member;

Fig. 3 is a cross-section taken on the line 3—3 of Fig. 2;

Fig. 4 is a vertical sectional view through the extractor mechanism;

Fig. 5 is a fragmentary elevational view of a portion of the spiral screw member and screen in an adjusted position;

Figure 7:
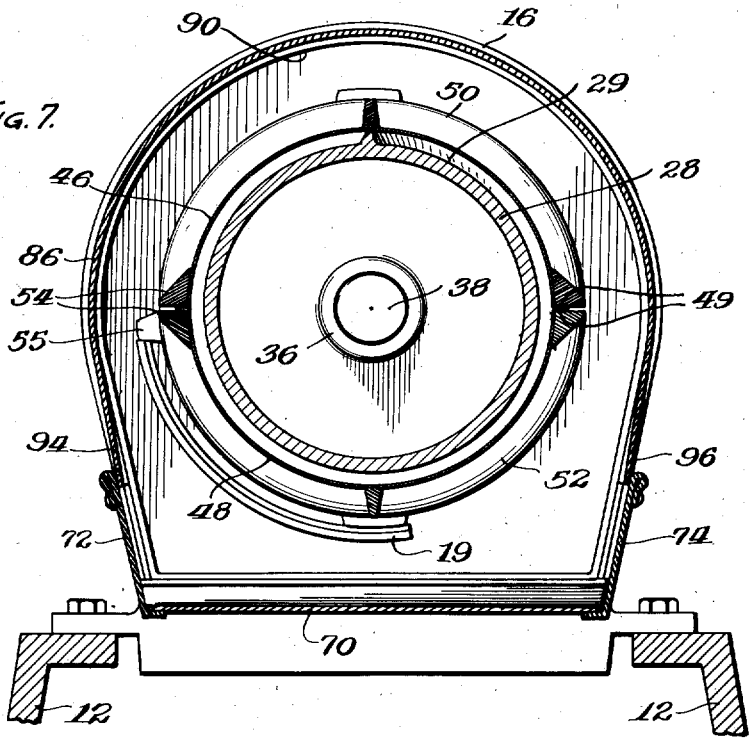
Fig. 7 is a similar sectional view looking in the opposite direction, taken on the line 7—7 of Fig. 4.
Figure 6:
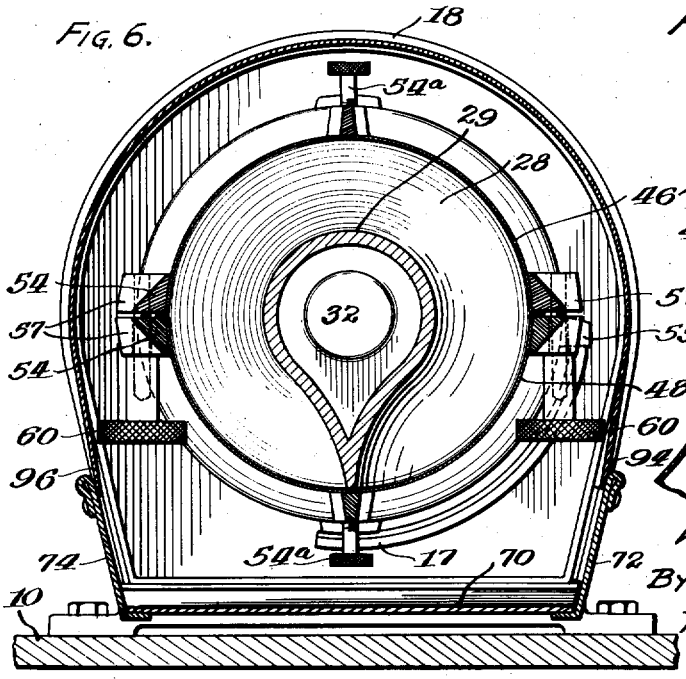
Fig. 6 is a vertical sectional view taken on the line 6—6 of Fig. 4.
Figure 8:
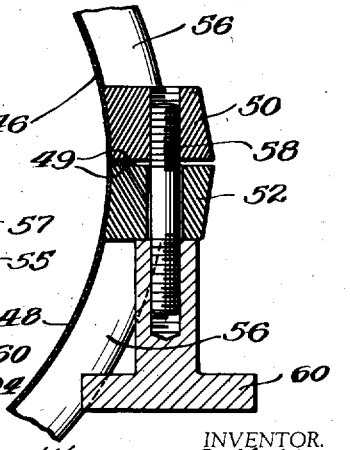
Fig. 8 is an enlarged fragmentary view showing the screen frame members and the manner in which they are connected.

Referring to Fig. 1, I provide a horizontal base member 10 which is supported by suitable leg members 12 and 14. A pair of bearing members 16 and 18 are mounted upon the base member 10 supporting the spiral screw member and other operating elements in a manner which will be presently described. The bearing member 18, as more clearly shown in Fig. 4, is formed with the hub portion 20 and a chamber portion 22. A hopper member 24 is adapted to be mounted in the upper end of chamber 22. The bearing 18 is further formed with a cylindrical flange member 26 in a side wall thereof within which a spiral screw conveyor member 28 is operatively mounted. The forward end 30 of the screw member may be secured to a shaft 32 which extends through a gasket 34 and packing mounted in the hub portion 20 of bearing 18. The discharge end of the screw member 28 may be formed with an end member 36 to which a shaft 38 is screw-threadedly connected. The shaft 38 is journalled in a hub portion 40 in the end bearing 16.

As can be seen, the bearing 16 is formed with a chamber 42 having an open lower end 44 through which pomace and other waste material is discharged, as will be presently described.

The screw member 28 is formed with a spiral thread 43 whereof the periphery lies in a surface parallel to the axis of the screw member throughout its length. The groove 29 between the threads 43 is formed in a gradually tapered manner so that at the forward or inlet end of the screw member the groove is comparatively deep and at the discharge end the groove is comparatively shallow, terminating at a circular ridge 91' which is slightly smaller than the diameter of the screw threads so that there is a constant circular discharge opening around the end of the screw.

A pair of semi-cylindrical screen members 46 and 48 are arranged to be positioned in a manner completely enclosing the screw member 28 between the bearings 18 and 16. The screen members are identical in shape and are formed with the lateral flanges 49 so that they can be held in position to form a cylindrical shell by means of a pair of holding frame members 50 and 52. The frame members 50 and 52 are also identical in shape and are formed with lateral bar portions 54 and vertical connecting ribs 56. A plurality of bosses 57 are provided in the lateral flanges 54 to receive studs 58 for securing the semi-cylindrical frame members together by means of thumb members 60.

A screen support frame is formed to rest upon a reduced flange 26a on bearing 18, and a similar flange 16a on bearing 16. As thus assembled, the screen forms a complete enclosure for the screw member 28 between the bearings 16 and 18.

The screen frame member 52 is formed with abutments 55 at each end adapted to bear against arcuate flanges 17 and 19 extended into the path thereof from the side walls of the bearings 16 and 18. The purpose of the flanges 17 and 19 is to prevent the rotation of screen frames 50 and 52, although it does not prevent a partial rotation. The purpose of permitting a partial rotation is to facilitate the removal or replacement or change of one of the screen members 46 or 48. Thus in the event that the bottom screen 48 is worn and it is desired to replace the same, the screen and frame may be partially revolved so that the lower half is moved to the top and in this position the same is easily removed without disassembling any other portion of the machine. A pair of stud members 54a are provided in the lateral flanges 54 for use as handles in lifting or removing screen frame members.

A lower pan member 70 is provided and formed with the side walls 72 and 74 for attachment to flanges 76 and 78 on bearings 16 and 18. The pan may be further formed with the downwardly sloping walls 80 and 82 to direct extracted juices to an outlet conduit 84 which may extend to any suitable or desirable reservoir. A cover plate 86, preferably formed of a resilient metal, is adapted to be placed over the flanges 90 and 92 of bearings 16 and 18 and to be engaged at its lower ends 94 and 96 within the walls 72 and 74 of the bottom pan so that the same is both securely held in place and also forms an air-tight connection with the bottom pan. By this arrangement it can be seen that comparatively little, if any, air is permitted to enter the screw member compartment and contaminate the material being worked on therein.

From the foregoing description it can be seen that materials such as tomatoes or any of the fruits or vegetables which have been mentioned hereinbefore can be dumped in the hopper 24 and as the screw member 28 is revolved the same will be fed forward into a gradually diminishing area between the groove of the screw and the screen members 46 and 48. By this operation a gradual but firmly increasing pressure is brought to bear upon the material, and as a result the juices are gradually and firmly pressed through the screens 46 and 48. The pomace or other waste material is adapted to be fed outwardly into chamber 42 and through the discharge opening 44, passing beyond the tapered edge 91 of the screw member 28 where the same rides in the tapered opening 93 in the flange 16a. The size of the opening between the two parallel faces 91 and 93 determines the thickness or density of the juices extracted and the amount of juice recovery from the material, and also the capacity or speed at which the machine operates. Regulation of the size of the opening is provided as will hereinafter be described, and this regulation is accomplished by moving the screw member axially forward or back from the tapered opening 93, and holding the same in a desired open or closed position. For example, as shown in Fig. 5, the opening is considerably larger than that shown in Fig. 4, and with the opening as shown, the operation of the machine is much more rapid and naturally the juices extracted will be thinner. It should, however, be clearly understood that due to the provision of the circular ridge 91', without regard to the discharge opening that is variable between the faces 91 and 93, there will be a definite and fixed control of the density and the amount of juices extracted.

From the foregoing explanation it can be seen that applicant has provided a machine wherein with the screw member withdrawn away from the discharge opening 93, the definite and fixed control of both the amount of juice extracted and the density of the same is constant by reason of the fact that it is necessary for all of the pomace to pass over the circular ridge 91' at the end of the screw. When, however, the screw is advanced towards the tapered discharge opening to close the same and the cross-sectional area of the space between the tapered end of the screw and the tapered opening within which the same telescopes becomes less than the cross-sectional area between the top of ridge 91' and the inside of the screen, then and at that point the discharge opening becomes the controlling factor in determining the rate of speed of discharge and, obviously, the density of the juice extracted.

Mechanism for adjusting the screw axially as described is shown in Figs. 2 and 3, and comprises the thrust collar 101 which is adapted to be screw-threadedly mounted upon a hub 103 of a bearing member 104. The thrust collar 101 is adapted to engage a ball bearing race 105 which lies adjacent a thrust washer 106 that bears against a shoulder 107 on the shaft 32. The thrust collar 101 is formed with a split portion having extended flanges 108 through which a thumb screw 109 is provided for either loosening or tightening the collar in a desired position.

Shaft 32 is formed with a reduced end 32*a* and a flat extension 32*b*. The portion 32*b* is adapted to engage a slot 110 in a driving shaft 112. The drive shaft 112 is connected through a suitable clutch mechanism 113 with a driving pulley 115 to which any suitable force or power may be applied.

When it is desired to reduce the speed or increase the amount of juice extracted from any given material, the screw member 28 is moved forward by loosening collar 101 and threading the same outwardly from the bearing 104, thus moving the screw member 28 by means of thrust washer 106. The operation of the machine is comparatively simple, as tomatoes or other material to be pulped and from which the juice is to be extracted, is fed through the hopper 24 and the same is carried forward by the spiral screw member.

Due to the diminishing area between the screw member and the screen 46, the tomatoes or other material are gradually squeezed tighter and tighter as they work forward and outwardly from the deep grooves at the forward end of the spiral to the more shallow grooves at the end. By this action, a gradual squeezing or pressure is placed upon them and the juices are forced outwardly through the screen where they fall upon the bottom pan 70 and pass outwardly through conduit 84. The pomace or waste which is the skin, seeds, core and fibre, is fed forward and discharged through the space between the end 91 of the spiral member and the discharge opening 93 in the chamber 42, where they in turn are discharged into a suitable container.

From the foregoing description, it can be seen that in order to remove or change screens, or to turn the screen so that the discharge end of the screen is at the inlet end, it is only necessary to remove the cover pan 86, loosen the thumb screws 60 and make the change. The necessity of removing the under-pan or any other parts is eliminated.

It can further be seen that the actual extracting operation takes place in a compartment from which air, which is very detrimental to juices, is practically excluded. It can very clearly be seen that no whipping, beating, or paddling operation is performed upon the material, thus further eliminating the possibility of permitting air to enter the juices extracted.

While in the specification throughout the description of the reduced diameter portion of the screw member I have referred to the annular ring as ridge 91′ and have again referred to it as a circular ridge or an annulus or a protruding annulus, I desire to clearly point out that these terms are more or less synonymous and are meant to be in the description hereinbefore referred to. The provision of a ridge or annulus of a smaller diameter than that of the parallel thread edges provides the element in my construction which contributes materially to the success of the operation of the machine. The pomace or pulp from which the juice has been squeezed passes from the screw in the annular space defined by the top of this portion of the screw and the interior of the screen and provides the desired adjustment under ordinary conditions. The addition of the frusto-conically shaped extension and the complementary housing within which the same may be projected is a further minute adjustment which is provided to vary the speed with which material passes from the machine when it is desired.

While I have described the appaartus with particular reference to extracting juice from tomatoes, the machine may also be used for pulping carrots, beets, orange peelings, or other material from which no waste is to be discharged. It will of course be understood that for pulping carrots, beets, or other materials mentioned, the taper of the grooves in the spiral may be changed to a more gradual taper if desired, and naturally for operating upon these materials, the speed of the machine will be reduced proportionately.

While screw presses have been in use prior to my invention, the distinction between the screw member which I employ and those employed by the devices of the prior art should be quite clearly understood. Former screw presses were constructed so that the entire screw tapered and had the appearance of a cone-like casting. The material to be worked upon was automatically fed in at the base of the cone and was required to work its way to the foremost end of the screw. The principal difficulty with this construction was that the circumference of the screw at the small end was so much less than at the inlet end that waste could not be quickly discharged, and screw presses of this type clogged very easily and very tightly so that they had a comparatively small capacity and frequently broke the screens from the pressure.

It should be borne in mind that in my improved spiral screw member the exterior edge of the thread lies in a surface parallel with the axis of the screw member, presenting a working surface capable of being operatively mounted in a cylindrical shell, and the groove is tapered from a comparatively great depth at the inlet end to a shallower depth at the waste end so that the waste material is fed out at a circumference which is the same as at the feed end. This feature increases the waste discharge opening to a point where very rapid operation of the machine is possible. The screw member as provided in the machine which I have described herein is so positioned that in operating on juicy products such as tomatoes, citrus fruits and the like, the feed from the hopper may be continuous and the waste is discharged continuously, as the juice has been squeezed out without clogging.

While I have illustrated and described a specific embodiment of my invention, it will be apparent to those skilled in the art that changes and modifications may be made in the exact details shown, and I do not wish to be limited in the exact details or in any particular; rather what I desire to secure and protect by Letters Patent of the United States is:

1. Apparatus for extracting juices including a housing, a cylindrical screen member in said housing, a spiral screw member therein formed with a thread having its outer edge portions in a surface parallel with the axis of the screw member, said edge portions, fitting closely within said screen and there being a groove intermediate adjacent convolutions of said thread, said groove starting at the inlet end of said housing at a considerable depth and gradually tapering to a very shallow depth at the discharge end of said housing, said screw member formed with a frusto-conical end face to fit into a complementary opening in said housing to provide an outlet having parallel side walls, said housing adapted to form an end bearing for said screw member and means for adjusting said screw member in said housing, said means including a drive shaft having a slotted end, a portion of said screw member engaging same, a bearing for said drive shaft and a thrust collar screw threadedly mounted thereon and adapted to bear against a shoulder on said screw member to move the same longitudinally.

2. Apparatus for extracting juices including a housing, a pair of semi-cylindrical screen members mounted thereon, a spiral screw member axially positioned within said screen members, said screw member having outer edges which lie in a surface parallel to the axis of the screw member, and having a groove of a considerable depth at the forward end, said groove tapering to a comparatively shallow groove at its extended end, and means for adjusting said screw member longitudinally in said housing, said means including a drive shaft having a slotted end, a portion of said screw member engaging said slotted end, a bearing for said drive shaft, a laterally movable thrust collar screw-threadedly mounted on said drive shaft bearing, and a collar mounted upon a reduced portion of said screw member and bearing against a shoulder on said screw member, said thrust collar being adapted to bear against said second named collar to move said screw member longitudinally.

3. Apparatus for pulping or extracting juices comprising a base having a horizontal upper surface, a housing mounted thereon, a pair of hollow end members secured to said housing, a cover plate for said housing and an underpan therebeneath, a pair of bearings in the outer vertical end walls of said end members, a pair of shafts mounted in said bearings, a spiral pulping member mounted on said shafts, a pair of semi-cylindrical screen members mounted between the inner end walls of said end members and surrounding said pulping member, a pair of semi-cylindrical holding frames surrounding said screen members, a shoulder on the inner end wall of each of said end members for supporting said holding frames, means for rigidly connecting said frames together to form a cylindrical casing about said screen members, arcuate flanges on the inner end walls of both of said end members and radial extensions on one of said frames adapted to engage said arcuate flanges to limit rotary movement of said frames to less than 270°.

4. Apparatus for pulping or extracting juices comprising a base having a horizontal upper surface, a housing mounted thereon, a pair of hollow bearing members in opposite ends of said housing, a shaft mounted in each of the outer vertical end walls of said bearing members, a spiral pulping member mounted on said shafts, a cylindrical screen member mounted between said inner vertical end walls of said bearing members and surrounding said pulping member, said pulping member being in the form of a spiral having a thread whose outer edges lie in a surface parallel with the axis of said pulping member and there being a gradually decreasing groove between adjacent convolutions of said thread edges, a frusto-conical surface on the discharge end of said pulping member and a complementary discharge opening in the end bearing therefor, a pair of semi-cylindrical holding frames for said screen member, a shoulder on the inner vertical end walls of each of said bearing members adapted to support said holding frames, means for connecting said frames together to form a rigid cylindrical casing for said screen member and means for moving said pulping member axially therein to decrease or enlarge the discharge opening at said discharge end, said means including a drive shaft having an end slot, a portion of said spiral pulping member engaging same, a bearing for said drive shaft, a thrust collar screw-threadedly mounted thereon, a ball bearing member on said spiral member mounting shaft positioned against a shoulder on the same, said thrust collar engaging said ball bearing member, whereby adjustment of said thrust collar wil move said spiral member longitudinally.

5. A juice extractor or pulper comprising a base, a horizontal housing positioned thereon, a pair of bearing members at opposite ends of said housing, said bearing members having chambers therein and cylindrical flange members on the inner end walls thereof, a spiral screw member having journals axially mounted in the outer end walls of said bearing members, a screen support frame mounted upon said cylindrical flange members on said bearings and capable of rotation thereon, a pair of semi-cylindrical screen members mounted in said frame between said bearings and enclosing said spiral member, a pair of arcuate flanges on the facing sides of the inner end walls of said bearings and abutments on said screen frame members adapted upon rotation of said frame members to bear against the arcuate flanges to permit rotation of said screen members less than 270 degrees whereby either of said semi-cylindrical screen members may be removed.

6. Apparatus for extracting juices including a housing, a cylindrical screen member in said housing, a spiral feed screw axially positioned within said screen member, said feed screw formed with a thread having its outer edge portions in a surface parallel with the axis of the screw member and there being a groove intermediate adjacent convolutions of said thread, said groove starting at the feed end of said screw at a considerable depth and gradually tapering at the discharge end to a shallow depth, an annular ridge at the said discharge end of said screw providing a constant size screw end opening in association with the screen member, a frusto-conically shaped portion extending therefrom, and a discharge opening in the end of said housing complementary to said frusto-conically shaped portion and means capable of cooperating therewith to form a control regulating the speed with which pulp is discharged from said feed screw.

7. A juice extractor comprising a base, a horizontal housing positioned thereon, a pair of bearing members forming the end portions of said housing, a spiral screw member axially mounted in said housing, a cylindrical screen mounted in said housing enclosing said screw member and means in the form of a protruding annulus associated with said screw member providing a constant size opening with said screen whereby material passing through is subjected to a constant pressure, and means associated with the screw for regulating the speed with which material passes through said machine.

8. A juice extractor comprising a base, a horizontal housing positioned thereon, a pair of bearing members forming the end portions of said housing, a screw member axially mounted in said housing and having a spiral thread, a cylindrical screen mounted in said housing enclosing said screw member, means associated with said screw member providing a constant size opening with said screen whereby the pressure to which material passing through is subjected is regulated, and means associated with the screw for regulating the speed with which material passes through said machine, said first means including a projecting annulus of smaller diameter than the maximum diameter of said screw member at the end of said screw thread, a frusto-conically shaped portion extending therefrom and a discharge opening in one of said bearing members complementary to said frusto-conically shaped portion of said screw member.

9. Apparatus of the class described including a housing, a cylindrical screen member in the housing, a spiral screw member therein formed with a thread having its outer edge portions in a surface parallel with the axis of the screw member, said edge portions fitting closely within said screen, and there being a groove intermediate adjacent convolutions of said thread, said groove starting at the inlet end of said housing at a considerable depth and gradually tapering to a shallow depth at the discharge end of said housing, said screw member having an annular ridge at the discharge end of a smaller diameter than the thread edges and being formed with a frusto-conically shaped end portion adapted to fit into a complementary opening in one end of said housing, said housing being formed with a hollow end bearing member having a journal for said spiral screw member beyond said discharge end, and adjusting means to regulate the size of said discharge opening by axial movement of said spiral screw member.

10. Apparatus for extracting juices including a housing, a cylindrical screen member in said housing, a spiral screw coaxially positioned within said screen member, means for rotating said screw relative to said screen member and housing, said screw being provided with an external thread the outer edges of the convolutions of which lie in a surface parallel with the axis of said screw and having a continuous groove between said edges, said groove starting at the feed end of said screw at a considerable depth and progressively becoming shallower toward the discharge end of the screw and terminating short of the extreme end of the body of said screw so as to provide an annular end projecting coaxially beyond the discharge end of said groove and thereby forming an annular opening between said annular end and the part surrounding the same which is circumferentially of constant width, and means cooperating with said annular end to provide a control regulating the rate of discharge of the pulp from the apparatus.

11. A juice extractor comprising a tubular screen, a coaxial screw rotatable in said screen and having a central body and a helical thread on its periphery the convolutions of which lie in a surface parallel with the axis of said body and which forms a helical groove between said body and said screen, said groove starting at the feed end of said screw at a considerable depth and progressively becoming shallower toward the discharge end of said screw, a control annulus of circular form extending axially from said body beyond said thread, a control flange arranged at the rear end of said screen and forming a coaxial outlet opening which is arranged opposite said annulus and forms with the latter an annular outlet passage through which the pulp is discharged from the trailing end of said groove and means permitting relative adjustment of said screw and flange lengthwise of said axis for varying the area of said outlet passage.

12. Apparatus for extracting juices including a housing, a cylindrical screen member in said housing, a spiral screw coaxially positioned within said screen member, means for rotating said screw relative to said screen member and housing, said screw being provided with an external thread, the outer edges of the convolutions of which lie in a surface parallel with the axis of said screw and having a continuous groove between said edges, said groove starting at the feed end of said screw at a considerable depth and progressively becoming shallower toward the discharge end of the screw and terminating short of the extreme end of the body of said screw so as to provide an annular end projecting coaxially beyond the discharge end of said groove and thereby forming an annular opening between said annular end and said screen member which is circumferentially of constant width, a frusto-conical shaped portion extending axially from said annular end, a complementary frusto-conical member carried by said housing, and means for adjusting the annular space between said frusto-conical portion and said complementary frusto-conical member to regulate the rate of discharge of the pulp from the apparatus.

13. Apparatus for extracting juices including a housing, a cylindrical screen member in said housing, a spiral screw coaxially positioned within said screen member, means for rotating said screw relative to said screen member and housing, said screw being provided with an external thread, the outer edges of the convolutions of which lie in a surface parallel with the axis of said screw and having a continuous groove between said edges, said groove starting at the feed end of said screw at a considerable depth and progressively becoming shallower toward the discharge end of the screw and terminating short of the extreme end of the body of said screw so as to provide an annular end projecting coaxially beyond the discharge end of said groove and said annular end being of smaller diameter than the diameter of the thread of said screw, and a frusto-conical shaped portion extending axially from said annular end, a complementary frusto-conical member carried by said housing, and means for adjusting the annular space between said frusto-conical portion and said complementary frusto-conical member to regulate the rate of discharge of the pulp from the apparatus.

14. A juice extractor comprising a cylindrical housing affording an intake opening and a discharge opening, a worm cooperating with said housing having a cylindrical helix in close proximity to the inner walls of said housing, the body portion of said worm intermediate adjacent convolutions of said helix being progressively of increasing diameter in the direction toward said discharge opening, an annular barrier terminating said helix and having concentric spaced relation with the inner wall of said housing, a frusto-conical section integrally formed with said worm having concentric spaced relation with a frusto-conical inner surface of said housing and means for varying the disposition of said worm longitudinally with respect to said housing.

15. A juice extractor comprising a cylindrical housing affording an intake opening and a discharge opening, a worm cooperating with said housing having a cylindrical helix in close proximity to the inner walls of said housing, the body portion of said worm intermediate adjacent convolutions of said helix being progressively of increasing diameter in the direction toward said discharge opening, an annular edge terminating said helix and having concentric spaced relation with the inner wall of said housing, a frustoconical section integrally formed with said worm having concentric spaced relation with a frustoconical inner surface of said housing and means for varying the disposition of said worm longitudinally with respect to said housing.

16. A juice extractor including a housing, a pair of bearing members forming the end portions of said housing, a spiral screw member axially mounted in said housing, a cylindrical screen mounted in said housing enclosing said screw member and means in the form of a protruding annulus associated with said screw member providing a constant size opening with said screen whereby material passing through is subjected to a constant pressure, and means associated with the screw for regulating the speed with which material passes through said machine.

AMERICAN UTENSIL COMPANY,
*Assignee of Louise R. McNitt Individually and as Executrix of the Estate of Willard C. McNitt, Deceased,*
By S. E. GRUENSTEIN,
*Secretary.*